United States Patent [19]

Zimmermann et al.

[11] Patent Number: 4,915,471
[45] Date of Patent: Apr. 10, 1990

[54] OPTICAL SPLICE AND METHOD FOR MAKING THE SAME

[75] Inventors: Bernd D. Zimmermann, Hickory, N.C.; Richard O. Claus, Christiansburg; Kent A. Murphy, Roanoke, both of Va.

[73] Assignee: Center for Innovative Technology, Herndon, Va.

[21] Appl. No.: 210,889

[22] Filed: Jun. 20, 1988

[51] Int. Cl.⁴ ............................................. G02B 6/38
[52] U.S. Cl. .................................. 350/96.21; 350/320
[58] Field of Search ............... 350/96.15, 96.20, 96.21, 350/96.22

[56] References Cited

U.S. PATENT DOCUMENTS

| | | | |
|---|---|---|---|
| 3,944,328 | 3/1976 | Kent et al. | 350/96.21 |
| 4,078,910 | 3/1978 | Dalgoutte | 350/96.21 X |
| 4,257,674 | 3/1981 | Griffin et al. | 350/96.21 |
| B1 4,257,674 | 7/1987 | Griffin et al. | 350/96.21 |
| 4,325,607 | 4/1982 | Carlsen | 350/96.21 |
| 4,691,985 | 9/1987 | Shank et al. | 350/96.18 |
| 4,711,518 | 12/1987 | Shank et al. | 350/96.20 |

Primary Examiner—John D. Lee
Attorney, Agent, or Firm—Kenyon & Kenyon

[57] ABSTRACT

The present invention pertains to an optical splice. The optical splice includes a member having an alignment cavity which receives optical waveguides and allows light to pass there between. The member is made of a material that is moldable such that when an optical waveguide is received by the member, the alignment cavity expands but constricts about the optical waveguide in a predetermined position. The member has a plurality of funnels which communicate with the alignment cavity and guide an optical waveguide into the alignment cavity where it is received thereby. The present invention also pertains to a method for making a funnel in a member. The method includes the steps of placing a drawn-down end of a capillary into a mold; inserting an alignment rod into the mold and the capillary through the drawn-down end thereof; filling the mold with a curable material; allowing the material to cure to form the member; and removing the alignment rod and capillary from the member to form in the member an alignment cavity with a funnel. In a preferred embodiment the member is an optical splice.

6 Claims, 1 Drawing Sheet

OPTICAL SPLICE AND METHOD FOR MAKING THE SAME

BACKGROUND AND DISCUSSION OF THE INVENTION

Optical splices should provide an accurate in-line coupling of two optical waveguides such as optical fibers. Preferably, the optical splice permits insertion, with relative ease, of the optical fibers into an alignment cavity provided by/the splice. To enhance insertion the optical splice may have flared ends which serve to guide the optical fibers into the cavity with the proper alignment.

U.S. Pat. No. 3,944,328 describes one method of achieving an alignment cavity with flared ends. A problem with the methods heretofore used to achieve an alignment cavity with flared ends is high precision machining required with respect to certain components used in the manufacturing process. This high precision manufacturing results in increased costs and impediments to more efficient production of the optical splices.

The present invention relates to an optical splice that has an alignment cavity with funnels to facilitate insertion of optical fibers therein which can be produced quickly, in mass, with the added feature of being reusable.

The optical splice comprises a member having an alignment cavity or bore which receives two optical waveguides in opposed relationship and permits light to pass therebetween. The member is made of a material that is moldable such that when an optical waveguide is received by the member, the alignment cavity deforms to accommodate the optical waveguide and hold it in a predetermined position under compression. The member has two funnels which communicate with the alignment cavity or bore and guide an optical waveguide into the alignment bore when inserted by the user.

In manufacturing the elements which form the splice significant economies of scale are achieved while maintaining the tolerances necessary for proper operation. A glass capillary tube is drawn down typically by heating until it achieves a cross-section substantially less than the original tube. After the desired size is obtained the collapsed or drawn portion the glass is broken in two pieces. The tips of the two pieces are polished by glass flame polishing or other standard glass polishing techniques.

The capillaries are then inserted into a mold, and an alignment rod is passed through each capillary and the drawn-down ends thereof until it extends entirely through the mold. The mold is then filled with a curable material which is cured to form the member. After curing, the alignment rod and capillaries are removed from the member leaving the splice in final form.

The above has been a brief description of some deficiencies in the prior art and advantages of the invention. Other advantages of the invention are apparent from the following detailed description of the preferred embodiments.

BRIEF DESCRIPTION OF THE DRAWINGS

In the accompanying drawings, the preferred embodiments of the invention and preferred methods of practicing the invention are illustrated in which.

DESCRIPTION OF THE PREFERRED EMBODIMENT

Figure 1:
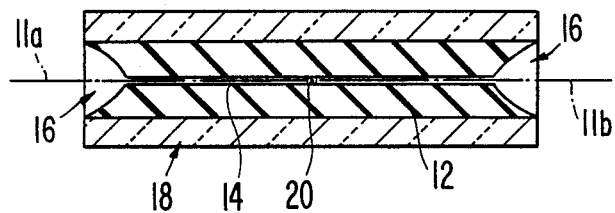
FIG. 1 is a schematic representation of an optical splice.

Referring now to the drawings, wherein like reference numerals correspond to similar or identical elements throughout the several views, and to FIG. 1 wherein there is shown an optical splice 10. The optical splice 10 is comprised of a member 12 having an alignment cavity or bore 14. The alignment bore cavity receives optical waveguides, such as optical fibers 11a and 11b, in opposed relationship and permits light to pass there between. The alignment bore 14 has a diameter smaller than the smallest diameter of an optical fiber 11 received.

As can be seen in figure 1 the fibers 11a and 11b are elongated glass optical fibers of substantially identical cross-sectional area and configuration. The ends of each fiber have been cut such that each end is substantially perpendicular to the longitudinal axis of the fiber. When properly inserted into the elastomeric material the ends are parallel and in abutting relationship. This enhances the ability of light waves passing through one fiber 11a to pass through the fiber interface with abutting fiber 11b.

The material 12 is formed from an elastomeric material and cured to change state from a liquid form to more rigid resilient form. With this configuration, when an optical fiber 11 is to accommodate the cross-section of a particular wave guide received by the member 12, the alignment bore 14 expands but holds the optical fiber 11 in a predetermined position by compression of the resilient material.

The material or member 12 has two funnels at each end of member 12 which communicate with the alignment bore 14. Each funnel 16 guides an optical fiber 11 into the alignment bore 14 when the optical fiber 11 is forced there through by the user.

The optical splice 10 preferably includes a capsule 18 completely circumscribing member 12. The capsule 18 is in the form of a hollow sleeve, cylindrical in configuration, with openings coextensive with the largest part of each funnel 16. The capsule 18 as shown is a right circular cylinder extending substantially the same length as member 12 and is preferably made of glass.

Preferably, the optical splice 10 includes index matching gel 20 disposed in the alignment cavity 14 between optical fibers 11 received by the alignment cavity 14. This gel is normally placed within bore 14 prior to insertion of the fibers In this manner the gel can fill any voids and may exist between the ends of the fibers when the user attempts to place these ends in abutting relationship.

In the operation of the preferred embodimet, optical fibers 11 are inserted through the openings of the capsule 18 into the funnels 16. The funnels 16 guide the optical fibers 11 into the alignment cavity 14 where they are placed at a predetermined position in the alignment cavity 14. The member 12, which is made of a cured elastomer, separates as the optical fiber 11 is received by the alignment cavity 14 since the alignment cavity 14 has a diameter which is smaller than the diameter of the optical fiber 11. The cured elastomer comprising member 12 causes the alignment cavity 14 to expand but also constricts about the optical fiber 11 to hold it in the predetermined position.

When light is transmitted through optical fiber 11a in the splice 10, it is emitted at the end of the optical fiber 11a into the alignment cavity 14. The index matching gel 20 that contacts the end of the optical fiber minimizes any reflections of the light and causes the light to continue to proprogate in the alignment cavity 14 to the optical fiber 11b in the splice 10. Since the index matching gel 20 also contacts the end of the optical fiber 11b, most of the light emitted by the optical fiber 11a is received by the second optical fiber 11b where it propagates in the second optical fiber 11b.

Figure 2:
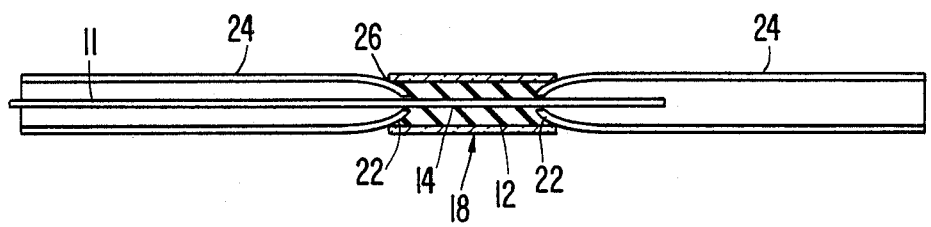
FIG. 2 is a schematic representation of a step in the manufacturing process of the optical splice.

A method for manufacturing the optical splice 10 with funnels 16 comprises the following steps. First, drawn-down ends 22 of capillaries 24 ar placed into the openings of the sleeve 18. Next, an alignment rod, preferably an optical fiber 11, is inserted into the capsule 18 and the capillaries 24. Then the capsule 18 is filled with preferably curable elastomer. This can be accomplished by the curable elastomer being introduced into the capsule IS at the interface 26 between the capsule 18 and the capillary 24. Since the curable elastomer is liquid at this stage of the method, the elastomer flows into the capsule 18 and surrounds the optical fiber 11 therein. The elastomer fills the capsule and at the openings of the capsule 18 takes on the shape of the drawn-down ends 22 of the capillaries 24 which extend into the capsule 18 as shown in FIG. 2.

Once the capsule 18 is filled with elastomer, the elastomer is cured until it reaches a solid resilient state. Capillaries 24 and the optical fiber 11 are then removed from the capsule 18. What remains is an optical splice 10 that has an alignment cavity or core 14 defined by the optical fiber 11 in the elastomer during molding and curing steps. Funnels 16 at the openings of the capsule 18 are similarly defined by the drawn-down ends 22 of the capillaries 24 in the capsule 18.

The capillaries with the funnel configuration are formed prior to the forming steps discussed above. In this embodiment a hollow tube is used preferably of a glass which will become plastic upon heating. The step of producing capillaries 24 having drawn-down ends 22 includes initially heating a portion of the capillary 24. Preferably, the approximate center of the capillary 24 is heated, with heat being equally provided entirely around the circumference of the center to render the glass molten or sufficiently plastic that the capillary 24 has become malleable. The capillary 23 can then be drawn down until it collapses. After the capillary 24 has been drawn down, heat is removed and the capillary scribed where it has collapsed. The capillary 24 is then broken in two pieces where scribed to provide two(2) separate pieces. Each piece has a tip where it was connected to the other piece before breaking. These tips are polished so that the optical fiber 11 to be held by optical splice 10 barely fits through. After this polishing step the tips of the two pieces has a conical shape which corresponds to the funnel molded into the ends of splice 10.

One of the advantages of the above-described process is that the step of drawing down the capillary 24 can be automated, and the tip polishing can be performed in less than four minutes. Thus, the nature and seed of these steps render this method particularly amenable to mass production of optical splices thereby reducing the cost of splices in the marketplace.

In general, the above method can be used whenever it is desired to make a funnel in a member, such as an optical splice 10. The glass sleeve selected in this embodiment forms the outer housing of the splice and also acts as part of a mold during the molding process. After the sleeve selection, a drawn-down end of a capillary is placed each end of the sleeve or capsule to form a mold cavity. An alignment rod which can be an optical fiber of the same size as that anticipated in the splice operation is inserted through each drawn-down end of the opposed capillary until it extends entirely through the mold. The mold cavity is then filled with a elastomeric material in a liquid form. The material is cured to form a solid resilient material that shrinks tightly around the rod. The alignment rod and capillaries are then removed from the member.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for manufacturing an optical splice with funnels comprising the steps of:
    inserting drawn-down ends of capillaries into openings in a sleeve;
    inserting an alignment rod into the sleeve and the capillaries;
    filling the sleeve with curable elastomer;
    curing the elastomer to a resilient state; and
    removing the drawn-down ends of the capillaries and the alignment rod from the sleeve.

2. The method according to claim 1 further comprising; producing capillaries having a configuration of the funnels to be molded into the elastomer prior to insertion into said sleeve.

3. The method according to claim 2 wherein the producing step includes the steps of heating a portion of a capillary;
    drawing down the capillary until it collapses;
    scribing the capillary where it has collapsed;
    breaking the capillary where it has been scribed into two pieces with each piece having a tip where it was connected to the other piece; and polishing the tips of the two pieces so that an alignment rod fits through the polished tips.

4. The method according to the claim 3 wherein the polishing step includes the step of polishing the tips of the two pieces into a conical shape; and wherein the alignment rod is an optical fiber.

5. A method for making a funnel in member which has a major aperture no more than 1.5 mm comprising the steps of:
    placing a drawn-down end of a capillary into a mold;
    inserting an alignment rod into the mold and the capillary through the drawn-down end thereof;
    filling the mold with a curable material;
    allowing the material to cure to form the member; and
    removing the alignment rod and capillary from the member 6. The method according to claim 5 wherein the removing step includes the step of removing the mold.

* * * * *